(12) United States Patent
Stringham

(10) Patent No.: US 9,607,071 B2
(45) Date of Patent: Mar. 28, 2017

(54) MANAGING A DISTRIBUTED DATABASE ACROSS A PLURALITY OF CLUSTERS

(71) Applicant: Adobe Systems Incorporated, San Jose, CA (US)

(72) Inventor: Russell R. Stringham, Orem, UT (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 130 days.

(21) Appl. No.: 14/200,611

(22) Filed: Mar. 7, 2014

(65) Prior Publication Data

US 2015/0254325 A1 Sep. 10, 2015

(51) Int. Cl.
  *G06F 17/30* (2006.01)
(52) U.S. Cl.
  CPC .............. *G06F 17/30584* (2013.01)
(58) Field of Classification Search
  USPC ................................................. 707/737, 972
  See application file for complete search history.

(56) References Cited

U.S. PATENT DOCUMENTS

| 5,765,166 | A | * | 6/1998 | Gotfried | ............... | G01S 13/726 |
| | | | | | | 342/190 |
| 6,014,669 | A | * | 1/2000 | Slaughter | .......... | G06F 17/30581 |
| | | | | | | 707/610 |
| 7,890,512 | B2 | * | 2/2011 | Mei | .................... | G06F 17/30265 |
| | | | | | | 382/224 |
| 8,140,523 | B2 | * | 3/2012 | Fakhouri | ................ | G06Q 10/04 |
| | | | | | | 707/720 |
| 8,255,425 | B1 | * | 8/2012 | Li | ..................... | G06F 17/30144 |
| | | | | | | 707/737 |
| 8,392,378 | B2 | * | 3/2013 | Pafumi | ............... | G06F 11/1658 |
| | | | | | | 707/640 |
| 2010/0235606 | A1 | * | 9/2010 | Oreland | .............. | G06F 17/3033 |
| | | | | | | 711/173 |
| 2012/0254175 | A1 | * | 10/2012 | Horowitz | .......... | G06F 17/30584 |
| | | | | | | 707/737 |
| 2012/0297056 | A1 | * | 11/2012 | Lee | ......................... | H04L 67/10 |
| | | | | | | 709/224 |
| 2013/0332484 | A1 | | 12/2013 | Gajic | | |

OTHER PUBLICATIONS

J. Chris Anderson et al., CouchDB: The Definitive Guide, O'Reilly Media, Inc., 1-272 (Jan. 2010).

* cited by examiner

*Primary Examiner* — Kim Nguyen
(74) *Attorney, Agent, or Firm* — Keller Jolley Preece

(57) ABSTRACT

A multi-cluster database management system is disclosed that distributes and manages data across a multi-cluster database through the use of cluster partitions. The multi-cluster database management system assigns cluster partitions to clusters of the multi-cluster database. The multi-cluster database management system can evenly or substantially evenly divide the cluster partitions and associated data among the clusters of the multi-cluster database. The multi-cluster database management system can scale in or out by adding or removing clusters from the multi-cluster database when needed or desired. Once a cluster is added or removed, the multi-cluster database management system re-balances the cluster partitions and the associated data across the clusters of the modified multi-cluster database.

20 Claims, 8 Drawing Sheets

MANAGING A DISTRIBUTED DATABASE ACROSS A PLURALITY OF CLUSTERS

CROSS REFERENCE TO RELATED APPLICATIONS

N/A.

BACKGROUND

1. Technical Field

One or more embodiments relate generally to managing databases. More specifically, one or more embodiments relate to systems and methods of managing a database distributed across a plurality of clusters.

2. Background and Relevant Art

Conventional databases often use a cluster of physical or virtual servers to store data and support operations. In order to accommodate for an increased need of resources or capacity, databases typically allow additional servers to be added to the cluster. Once the size of the cluster is increased, some conventional databases (such as NoSQL databases) can allow the data to be spread across the servers in the larger cluster. Along related lines, to accommodate decreased needs, some conventional databases can allow for the removal of servers from the cluster. Once the size of the cluster is decreased, such databases may allow the data to be re-distributed across the servers of the smaller cluster.

While conventional databases provide many advantages, they nonetheless have several drawbacks. For example, conventional NoSQL databases often have a limitation on the number of servers that can be included in a cluster. As such, in order to accommodate larger amounts of data, including larger datasets, multiple clusters may be needed.

Unfortunately, managing a dataset across multiple clusters of a conventional NoSQL database presents various problems. In particular, conventional NoSQL databases often lack the ability to evenly distribute data across a plurality of clusters. The inability to evenly distribute data can lead to overloading of some clusters and simultaneous under utilization of other clusters. Overloading of a cluster can decrease database responsiveness and result in cluster down time. On the other hand, under utilization of a cluster can waste valuable resources.

Conventional solutions to including more than one cluster in a database typically involve a client-side application sharding the data between clusters. In other words, an application relying upon multiple clusters typically is required to recognize the different clusters and know which data to send to, and request from, which cluster. As a result, an application relying on multiple clusters often requires additional code in order to interact with multiple clusters. The additional code requires additional effort, time, and cost to debug and maintain.

The required complexity and the increased potential for problems related to the use of multiple clusters are exacerbated when there is a need or desire to add or remove clusters. In particular, a developer/administrator typically would need to modify the application to direct data to new clusters or away from removed clusters. Such rebalancing traditionally has been time consuming and/or inefficient. As the complexity and size of the cluster(s) increase, the burden on the developer/administrator increases accordingly, thereby increasing the time, complexity of analysis, and/or potential risk of errors. Errors in the rebalance process can result in data being unavailable for extended periods of time.

In addition, errors in the data rebalance process can eventually result in breaking data consistency within the database.

Perhaps due to the complexities of relying upon multiple clusters, some conventional single-cluster databases allow for large numbers of servers. Large single-cluster databases, however, also have several drawbacks. For example, in conventional single-cluster database systems, if the cluster goes down, all data in the system may be inaccessible during the downtime. Losing the ability to access data can lead to the loss of consumer confidence in an application relaying upon the database system. With increasing competition and high reliability expectations, such database system down time can cause a permanent loss of customers.

Additionally, it is not uncommon for conventional database systems to have a least-common-denominator hardware utilization scheme. In other words, a single-cluster database system may only operate at the equivalent of the capabilities of the lowest performing hardware in the cluster. Thus, before gaining benefits from new hardware with higher performance capabilities, all of the hardware in the cluster may need to be replaced.

These and other disadvantages may exist with respect to conventional databases and management of conventional databases.

SUMMARY

Embodiments solve one or more of the foregoing or other problems in the art with systems and methods for managing databases including a plurality of clusters. For example, the systems and methods provide for distribution and re-distribution of data across a plurality of clusters. More specifically, the system and methods can allow for even or substantially even distribution of a data set across a plurality of clusters.

The ability to distribute/re-distribute data across a plurality of clusters, provided by one or more embodiments, allows for efficient adding and removing of clusters from a database. Additionally, the systems and methods described herein can re-distribute/balance data across a database expanded by the addition of a cluster or contracted by the subtraction of a cluster. In particular, the systems and methods of one or more embodiments can transfer or move portions of a dataset between clusters of a multi-cluster database to balance the dataset across the clusters.

In one or more embodiments, the methods and systems provide the ability to effectively manage a database with a plurality of clusters without having to modify an application that provides, accesses, reads, or writes data to the plurality of clusters. In particular, one or more embodiments provide a multi-cluster database that appears and functions as a single cluster from the perspective of client application(s) interacting with the multi-cluster database. Thus, one or more embodiments allow for the adding or removing of clusters from a multi-cluster database without the need to notify or modify client applications interacting with the multi-cluster database.

Additional features and advantages of exemplary embodiments will be set forth in the description which follows, and in part will be obvious from the description, or may be learned by the practice of such exemplary embodiments. The features and advantages of such embodiments may be realized and obtained by means of the instruments and combinations particularly pointed out in the appended claims. These and other features will become more fully apparent from the following description and appended claims, or may be learned by the practice of such exemplary embodiments as set forth hereinafter. The foregoing summary is not an extensive overview, and it is not intended to identify key elements or indicate a scope any embodiments. Rather the foregoing summary identifies aspects of embodiments as a prelude to the detailed description presented below.

BRIEF DESCRIPTION OF THE DRAWINGS

In order to describe the manner in which the above recited and other advantages and features can be obtained, a more particular description briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments and are not therefore to be considered to be limiting of its scope, the invention will be described and explained with additional specificity and detail through the use of the accompanying drawings in which.

DETAILED DESCRIPTION

Figure 1:
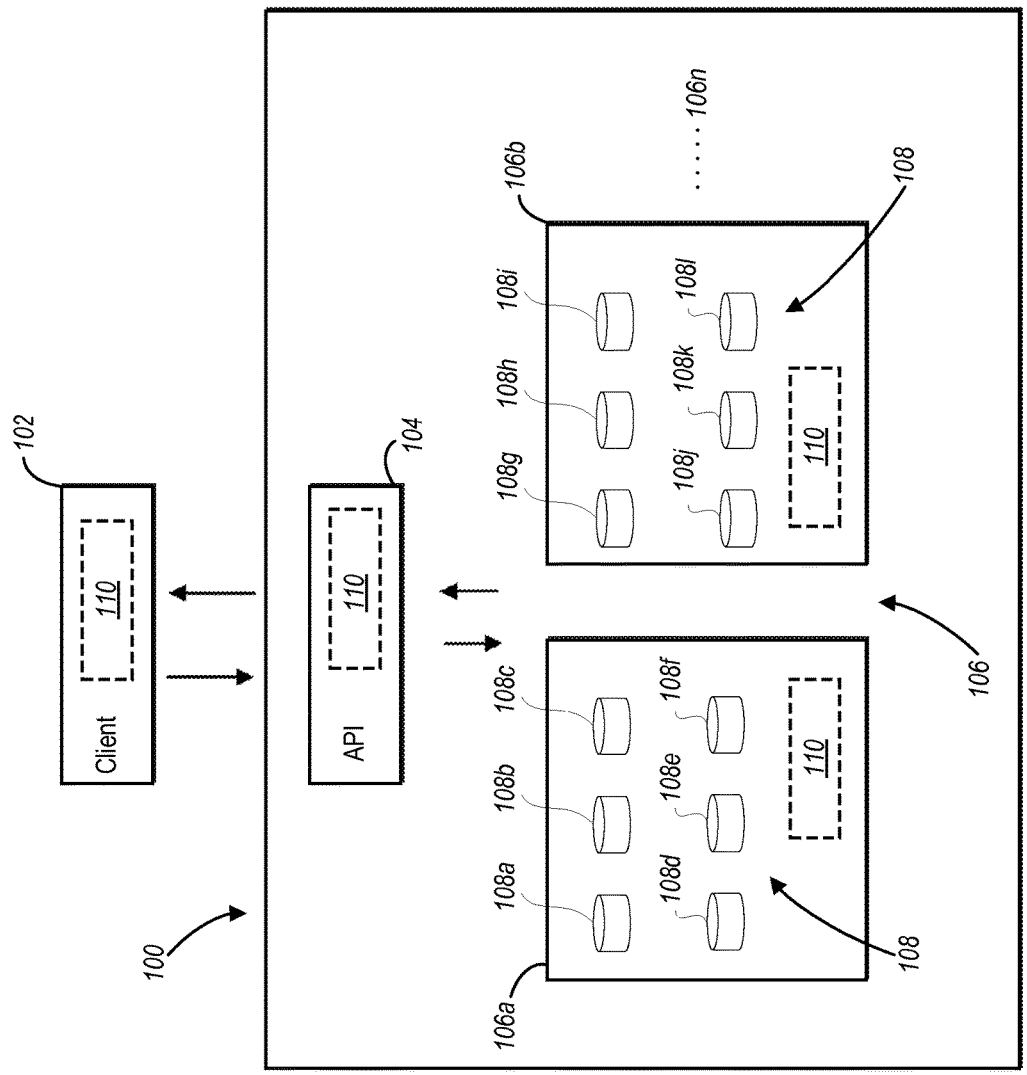
FIG. 1 illustrates a schematic diagram of a multi-cluster database system in accordance with one or more embodiments.

One or more embodiments include a multi-cluster database management system that allows for management of a dataset across a plurality of clusters through the use of cluster partitions. Each cluster partition is assigned a portion of the data of multi-cluster database. The multi-cluster database management system divides the cluster partitions among the clusters of the multi-cluster database to evenly distribute the data across the clusters. Upon the addition or removal of a cluster, the multi-cluster database re-assigns or re-distributes the cluster partitions among the clusters, which causes an even redistribution of data.

As used herein, the term "cluster partition" refers to a virtual data storage location that is used to map data to a physical storage location within a multi-cluster database. In particular, a cluster partition is assigned a key identifier or a range of key identifiers of a cluster key space. All the key identifiers making up the cluster key space are divided among the cluster partitions. Thus, a cluster partition can be considered an owner of a conceptually computed subset of key identifiers making up a cluster key space.

The cluster partitions are in turn divided among the clusters of a multi-cluster database. Data is then distributed/stored/accessed in the multi-cluster database through the use of the cluster partitions. More specifically, the multi-cluster database management system computes a key identifier (key ID) for each piece of data. The computed key ID maps to a cluster partition, which in turns maps to a cluster where the data is stored.

The cluster partitions provide a layer of abstraction between the key IDs and the cluster that is responsible for the given key IDs. This layer of abstractions ensure that each key ID maps to the same cluster partition regardless of the number/configuration of clusters in the multi-cluster database system. Thus, the cluster partitions aid in managing and reducing complexity associated with adding and removing clusters from a multi-cluster database.

As mentioned, the multi-cluster database management system assigns cluster partitions to clusters of a multi-cluster database. In other words, the multi-cluster database management system assigns a cluster to host a cluster partition. As such, the assigned cluster hosts data having key IDs corresponding to key IDs assigned to the cluster partition. In particular, the multi-cluster database management system can evenly or substantially evenly divide the cluster partitions among the clusters of the multi-cluster database.

Upon the addition or removal of a cluster to or from the multi-cluster database, the multi-cluster database management system can re-allocate and/or reassign the cluster partitions among the clusters in the modified multi-cluster database. The multi-cluster database management system can transfer the data associated with the re-allocated or reassigned cluster partitions to the new assigned clusters. Thus, the cluster partitions can allow for easy re-distribution of data to ensure even loads across the multi-cluster database.

For example, the multi-cluster database management system can allow for expansion of a single-cluster database to a dual-cluster database, a dual-cluster database to tri-cluster database, and so forth. Upon the addition of new cluster(s), the multi-cluster database management system can re-distribute data across the original cluster(s) and the new cluster(s) by assigning cluster partitions to the news clusters of the database.

Along related lines, the multi-cluster database management system can allow for the downsizing of a multi-cluster database by the removal of cluster(s) from a multi-cluster database. For instance, the multi-cluster database management system can allow for reduction of a dual-cluster database to a single-cluster database, reduction of a tri-cluster database to a dual-cluster database, and so forth. As part of, or prior to, removal of cluster(s), the multi-cluster database management system can distribute cluster partitions hosted on the removed cluster(s) across the remaining cluster(s).

Whether after the removal or the addition of clusters, the multi-cluster database management system can ensure even or substantially even distribution of data across the clusters of the multi-cluster database. In particular, the multi-cluster database management system can transfer, share, or otherwise distribute data across multiple clusters. The ability to evenly or substantially evenly distribute data across the clusters of a multi-cluster database can help ensure that some clusters are not overloaded while other clusters are underutilized.

In one or more embodiments, the multi-cluster database management system can effectively manage a multi-cluster database without having to modify an application that provides, accesses, reads, or writes data to the plurality of clusters. In particular, the multi-cluster database management system can allow the multi-cluster database to appear and function as a single cluster from the perspective of client application(s) interacting with the multi-cluster database. Thus, the multi-cluster database management system can remove or add clusters without the need to notify or modify client applications interacting with the multi-cluster database. In alternative embodiments, the multi-cluster database management system can be implemented as part of the client application(s) interacting with the multi-cluster database.

In addition to the foregoing, the ability to distribute, share, and balance data across a plurality of clusters described herein can provide access to data in a database system when a cluster does down. For example, in a multi-cluster implementation in accordance with one or more embodiments, if a cluster goes down, only the data on the down cluster may be inaccessible. Thus, if the multi-cluster database includes ten clusters and a cluster goes down, 90% of the data in the system can remain available.

Furthermore, the ability to update the hardware one cluster at a time can allow a database system to gain the benefits of new hardware without having to replace all of the hardware in the database system. For example, a system administrator can upgrade the hardware of a single cluster and provide the updated cluster with fewer nodes than clusters running older hardware to help ensure processing balance across clusters. Thus, one or more embodiments can allow a database system to gain the benefit of new hardware without having to upgrade the entire database system.

As used herein, the term "cluster" or "database cluster" refers to a set of one or more nodes. As used herein the term "node" or "database node" refers to a computing resource capable of storing and manipulating data. Nodes can comprise computing hardware such as processors, storage devices, and/or network interfaces. In addition, nodes can comprise virtualized instances of computing hardware. For instance, a single enterprise-class processor may be presented as a dozen or more virtual processors utilized in a multitude of nodes. Virtualization and other techniques can also combine hardware into a unified virtual construct. For example, multiple storage devices may be presented as a single unified storage device. In various embodiments, nodes comprise any number and/or any portion of a resource, both real and virtual. For example, each node can comprise a server device, a portion of a server device, or a collection of server devices.

In some instances, the multi-cluster database management system can manage data that makes up a dataset. As used herein, the term "dataset" refers to an entire collection of related data. For example, a dataset can comprise the data used for supporting a particular application or suite of applications.

FIG. 1 is a schematic diagram illustrating a multi-cluster database system 100 (or "database system") according to an embodiment. In one or more embodiments the database system 100 can comprise a NoSQL or other non-relational database. The database system 100 can store and manage data. For example, the multi-cluster database system 100 can store and manage XML data, JSON documents, BSON documents, JAVA content or objects, binary data, or other types of data.

As shown, a client 102 can communicate with an application-programming interface (API) 104 of the database system 100. The client 102 can communicate with the API 104 via a network such as, for example, the Internet, an intranet, Bluetooth, or another communication channel. While FIG. 1 illustrates a single client 102, one will appreciate that in alternative embodiments a plurality of different clients 102 can interact with the database system 100, and the API 104 in particular. The client 102 can comprise or be implemented on any of the computing devices described below in reference to FIG. 6. Thus, the client 102 can comprise software, hardware, or both. For example, the client 102 can comprise an application, such as an interactive mobile application. Another example of a client application is ADOBE ANALYTICS.

The API 104 can allow the client 102 to pass data and commands to the database system 100 without requiring the client 102 to have detailed knowledge about the configuration of the database system 100. For example, the API 104 may translate client commands based on a client protocol and a database system protocol. In one or more embodiments, the API 104 includes a specification of interface commands supported by system components, such as the database clusters 106a, 106b and database nodes 108a-f, 108g-1. The API 104 may also perform one or more gatekeeping functions, such as, but not limited to permission verification, data encryption, data compression, and/or apply other suitable transformation to communications based on a global policy, a client or system identifier, or another trigger.

Referring still to FIG. 1, the API 104 is in communication with the database clusters 106a, 106b, . . . 106n. The clusters 106 are each a set of one or more database nodes 108 (of which nodes 108a-1 are examples). Each node 108 represents a computing resource capable of storing and manipulating data and can include one or more node characteristics as described above.

The database system 100 can further comprise a multi-cluster database management system 110. The multi-cluster database management system 110 can shard or distribute data among the clusters 106 and the nodes 108 of the database system 100. The multi-cluster database management system 110 can comprise multiple, cooperating application, a stand-alone application, a module of an application, a plug-in, a library function or functions that may be called by other applications, or a proxy.

As shown by FIG. 1, the multi-cluster database management system 110 can be implemented as part of the client 102, the API 104, the clusters 106, or a combination thereof. When the multi-cluster database management system 110 is implemented as part of the client 102, the client 102 can identify which cluster 106 and node 108 to direct request. Alternatively, when the multi-cluster database management system 110 is implemented as part of the API 104 or the clusters 106, the client 102 can direct a request to the database system 100, and the database system 100 can route the request to the proper cluster 106 and node 108. When implemented as part of the clusters 106, in at least one embodiment, at least a portion of the multi-cluster database management system 110 can be included in each node 108 of the database system 100. For example, a table or index including a mapping scheme (described in greater detail below in reference to FIG. 3A) can reside on each node 108. The nodes 108 can use the table or index to identify where to route requests or whether to respond to requests.

Figure 2:
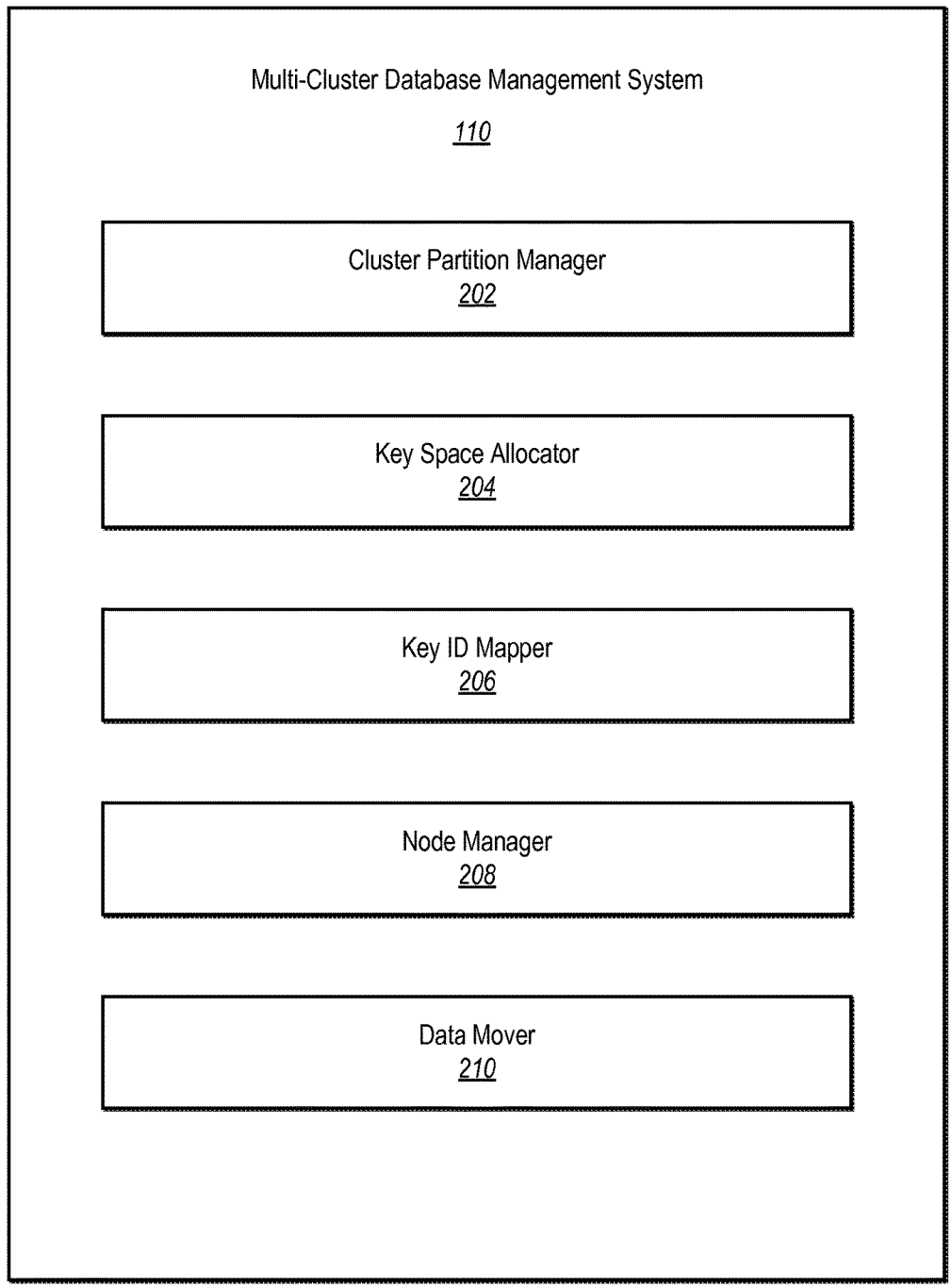
FIG. 2 illustrates a schematic representation of a multi-cluster database management system 110 in accordance with one or more embodiments.

FIG. 2 illustrates an embodiment of a multi-cluster database management system 110. As illustrated, the multi-cluster database management system 110 may include, but is not limited to, a cluster partition manager 202, a key space allocator 204, a key ID mapper 206, a node manager 208, and a data mover 210. Each of the components 202-210 of the multi-cluster database management system 110 can be in communication with one another using any suitable communication technologies.

It will be recognized that although the components 202-210 of the multi-cluster database management system 110 are shown to be separate in FIG. 2, any of components 202-210 may be combined into fewer components, such as into a single component, or divided into more components as may serve a particular implementation. The components 202-210 can comprise software, hardware, or both. For example, the components 202-210 can comprise one or more instructions stored on a computer-readable storage medium and executable by processors of one or more computing devices. When executed by the one or more processors, the computer-executable instructions of the multi-cluster database management system 110 can cause the computing device(s) to perform the methods described herein. Alternatively, the components 202-210 can comprise hardware, such as a special purpose processing device to perform a certain function or group of functions. Additionally or alternatively, the components 202-210 can comprise a combination of computer-executable instructions and hardware.

As mentioned above, the multi-cluster database management system 110 can shard or distribute data among the clusters 106 and the nodes 108 of the database system 100. In particular, the multi-cluster database management system 110 can evenly divide (to the extent possible) data across the clusters 106, and in turn across the nodes 108 of each cluster. In particular, the cluster partition manager 202 can assign one or more cluster partitions to each cluster 106. For example, the cluster partition manager 202 can select a total number of cluster partitions to assign based on the number of clusters 106 in a database system 100.

In one example embodiment, the cluster partition manager 202 can select a total number of cluster partitions that is multiple times greater than the total number, or total expected number, of clusters 106 in a database system 100. More particularly, in one or more embodiments cluster partition manager 202 can select the total number of cluster partitions to be about 1-2 orders of magnitude larger than the total number of actual or expected clusters 106 in the database system 100. Having a total number of cluster partitions that is significantly greater than the total number of actual or expected clusters 106 can allow for efficient re-distribution of the cluster partitions upon adding or removing clusters 106.

When the number of cluster partitions is significantly less than an order of magnitude larger than the current number of clusters, it can be difficult to maintain an even distribution of data and load across clusters, and in the worst case, some clusters may see twice the data and load of other clusters. In some implementations, the cluster partition manager 202 may be able to dynamically increase the number of cluster partitions in an efficient manner by setting the new number to an integer multiple M of the previous number. This can be done without data movement as each cluster partition is logically broken or divided into M cluster partitions that are each 1/M the size of the original cluster partition. The cluster partition manager 202 may decide to do this when the number of clusters grows to be within a half an order of magnitude of the number of cluster partitions.

Once the cluster partition manager 202 selects the number of cluster partitions, and assigns the cluster partitions to clusters 106, the key space allocator 204 can assign identifiers, values, or ranges of a first key space (i.e., cluster key space) to each of the cluster partitions to help ensure even distribution of data among the clusters 106. The multi-cluster database management system 110 can also use a second key space (i.e., node key space) to help ensure even distribution of data among the nodes 108, as explained further below. The cluster key space can be a single key space that is shared/divided among all of the cluster partitions. Moreover, the cluster key space can vary depending upon the type of data being stored and the number of clusters 106 in the database system 100. The cluster key space can be based on a key used for the data stored in the database system 100.

For example, in one embodiment the key can comprise a hash of a document ID, a user ID, the key portion of a key/value pair, or another data identifier associated with a piece of data, or a combination of multiple identifiers. The hash can optionally comprise a cryptographically secure hash. One non-limiting example of a cryptographically secure hash is a MD5 hash. The MD5 hash can produce a 128-bit hash value, which can be expressed in text format as a 32 digit hexadecimal number. The multi-cluster database management system 110 can use a defined number of bits of the hash for determining the key. For example, 10 bits of the hash can provide 1024 different values or identifiers, which can comprise the cluster key space and map to 1024 cluster partitions. In one embodiment the multi-cluster database management system 110 can use the first 10 bits of the hash. In alternative embodiments, the multi-cluster database management system 110 can use the last 10 digits of the hash. In still further embodiments, the multi-cluster database management system 110 can use less than 10 bits or more than 10 bits for defining the cluster key space.

The key space allocator 204 can assign each of the cluster partitions an identifier or a range of the 1024 different values or identifiers of the cluster key space. For instance, in one or more embodiments, the cluster partition manager 202 can use 1024 cluster partitions to manage the database system 100. In such embodiments, the key space allocator 204 can assign each of the cluster partitions one of the identifiers from the applicable 10 bits of the MD5 hash. Alternatively, cluster partition manager 202 can use less than 1024 cluster partitions and the key space allocator 204 can assign multiple identifiers or values from the applicable 10 bits of the MD5 hash to each of the cluster partitions.

One will appreciate that 10 bits of a cryptographically secure hash of an ID can comprise a suitable key space due to the ability to evenly distribute IDs among the 1024 different values or identifiers. The present invention, however, is not limited to using a cryptographically secure hash (or a portion thereof) as a key space. For example, in alternative embodiments the key can comprise a first letter of a user name associated with each piece of data. In this case, the cluster key space can comprise the letters of the alphabet. The key space allocator 204 can divide ranges of the letters of the alphabet between the cluster partitions of the database system 100. In particular, if there are 13 cluster partitions, the key space allocator 204 can assign each cluster partition two letters of the cluster key space (i.e., a and b assigned to cluster partition 1 and so forth). Thus, if the database system 100 includes two clusters (i.e., cluster 106a and 106b shown in FIG. 1), the cluster partition manager 202 can assign cluster partitions 1-6 to cluster 106a and assign cluster partitions 7-13 to cluster 106b. One will appreciate that using the letters of the alphabet for the key space may be less optimal than using a cryptographically secure hash, because the data may not evenly distribute across each of the cluster partitions. For example, user names may be much more likely to start with the letter M compared to the letter X.

Along related lines, in further embodiments the key can be a first alphanumeric character of an identifier associated with each piece of data. In this case, the cluster key space can comprise the numbers 0-9 and the letters of the alphabet. The key space allocator 204 can divide ranges of the cluster key space between cluster partitions of the database system 100. Thus, if the database system 100 includes 10 cluster partitions, the key space allocator 204 can assign 0 and a-c to cluster partition 1, 1 and d-f to cluster partition 2, and so forth. The cluster partition manager 202 can in turn assign the 10 cluster partitions to the clusters 106 of the database system 100.

Once the cluster partition manager 202 has assigned the cluster partitions to particular clusters 106, and the key space allocator 204 has divided the cluster key space among the cluster partitions, the key ID mapper 206 can use this information to map data or data pieces to a particular cluster 106. For example, the multi-cluster database management system 110 can receive a request to process a piece of data. The request to process a piece of data can comprise a request to write data to the database system 100, read data from the database system 100, update data in the database system 100, increment data values within the database management system 100, access data from the database system 100, or otherwise manipulate data stored or data to be stored in the database system 100

Upon receiving the request, the key ID mapper 206 can identify a key ID for the piece of data. For example, the key ID mapper 206 can perform a hash of an ID associated with the piece of data, or otherwise identify a key ID for the piece of data. Once the key ID for the data is identified, the key ID mapper 206 can determine the applicable cluster 106 for the data and route the request or the piece of data to the applicable cluster 106. For example, the key ID mapper 206 can determine to which cluster partition the key ID corresponds, and in turn to which cluster 106 the determined cluster partition is assigned.

In addition to determining to which cluster 106 a particular piece of data corresponds, the key ID mapper 206 can also determine to which node 108 of the cluster 106 the data belongs. For example, a node manager 208 can use any number of different management schemes for distributing data among the nodes 108 of a cluster 106. In at least one embodiment, the node manager 208 uses a key-space based scheme to distribute data among the nodes 108 of a cluster 106. Suitable exemplary key-space based cluster management schemes include a vBucket scheme (such as that used by COUCHBASE), a key range scheme (such as that used by CASSANDRA), a shard key scheme (such as that used by MONGODB), or another cluster management scheme.

In any event, the key space allocator 204, directly or indirectly, divides a second key space (i.e., node key space) among the nodes 108 of a cluster 106. The node key space can be a separate and non-overlapping key space relative to the cluster key space. Using different key spaces for distributing data across the clusters 106 and the nodes 108 can help ensure even distributions and allow for easier transfer of data between nodes 108 upon the addition or the removal of a cluster 106 to or from the database system 100, as explained in greater detail below.

In contrast to the cluster key space, which is a single key space divided among the all clusters 106 of the database system 100; the node key space is a key space that is divided among the nodes 108 of each cluster 106. Thus, referring to FIG. 1, key space allocator 204 divides an entire node key space among the nodes 108a-f of cluster 106a. The key space allocator 204 can also again divide the entire node key space among the nodes 108g-1 of cluster 106b. As such, each key ID is assigned to node 108 in each cluster 106. While each cluster 106 will include the full node key range, each cluster 106 need not have the same number of nodes 108.

The node key space can vary depending upon the type of data being stored and the number of nodes in the database system 100 or in each cluster 106. The key space allocator 204 can base the node key space on a key used for the data stored in the database system 100. For example, in one embodiment the key can comprise a hash of a document ID, a user ID, another data identifier associated with a piece of data, or a combination of multiple identifiers. For example, in one embodiment the multi-cluster database management system 110 can use 10 bits of the same hash used for the cluster key space. As mentioned previously, however, in at least one embodiment the 10 bits used for the node key space can differ from the 10 bits used for the cluster key space. Otherwise, the data within each cluster may not be evenly distributed. In particular, in one embodiment, the key space allocator 204 can use the first 10 bits of the hash for the cluster key space and the bits 11-20 for the node key space.

The key space allocator 204 can directly or indirectly assign each of the nodes 108 of a cluster 106 an identifier/value or a range of the node key space. For example, the key space allocator 204 can directly assign a value/identifier or range of the node key space to the nodes 108 using a key range scheme or a shard key scheme. In particular, the key space allocator 204 can assign each node 108 a range of the node key space.

Alternatively, the node manager 208 can indirectly assign a value/identifier or range of the node key space to nodes 108 by using a vBucket scheme. A vBucket can comprise a data storage location. In at least one embodiment, the node manager 208 can use 1024 vBuckets to manage each cluster 106. In such embodiments, the key space allocator 204 can assign each of the vBuckets one of the values/identifiers from the applicable 10 bits of the MD5 hash. Alternatively, node manager 208 can use less than 1024 vBuckets and the key space allocator 204 can assign multiple values/identifiers from the applicable 10 bits of the MD5 hash to each of the vBuckets. The node manager 208 can in turn assign each vBucket to a node 108 of a cluster 106.

The key ID mapper 206 can use the allocations of the node key space to map data or data pieces to a particular node 108. For example, after the key ID mapper 206 has identified the applicable cluster 106 for a piece of data, the key ID mapper 206 can identify a second key ID for the piece of data applicable to the node key space. For example, the key ID mapper 206 can perform a different hash of an ID associated with the piece of data than the hash performed in connection with cluster key space. Alternatively, as explained above, the key ID mapper 206 can use the same hash. In any event, once the second key ID for the data is identified, the key ID mapper 206 can determine the applicable node 108 of the previously identified cluster 106 and route the request or the piece of data to the applicable node 108. For example, the key ID mapper 206 can determine to which vBucket the key ID corresponds, and in turn to which node the determined vBucket is assigned.

Figure 3A:
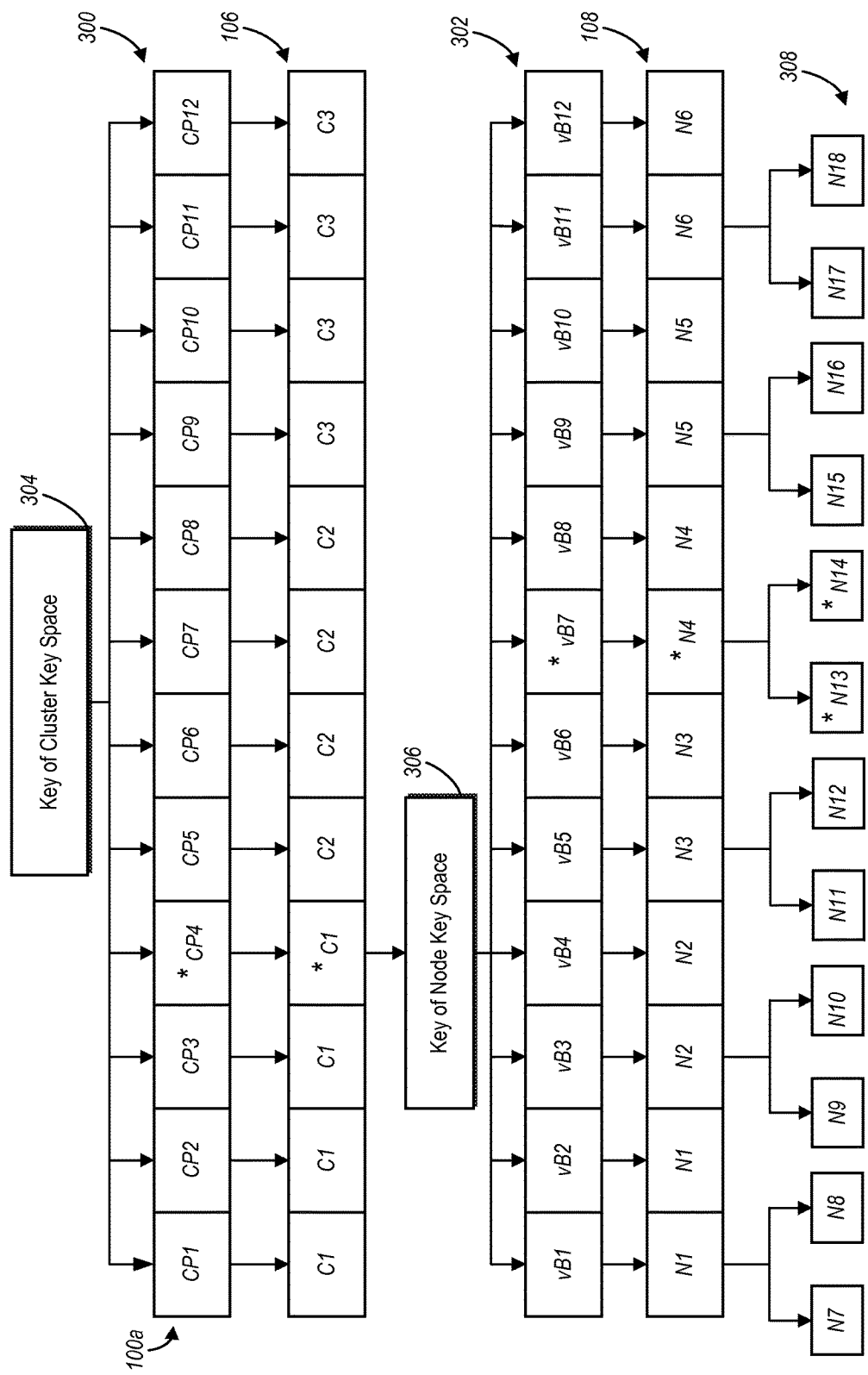
FIG. 3A illustrates a schematic representation of a multi-cluster database system and an associated mapping scheme in accordance with one or more embodiments.
Figure 3B:
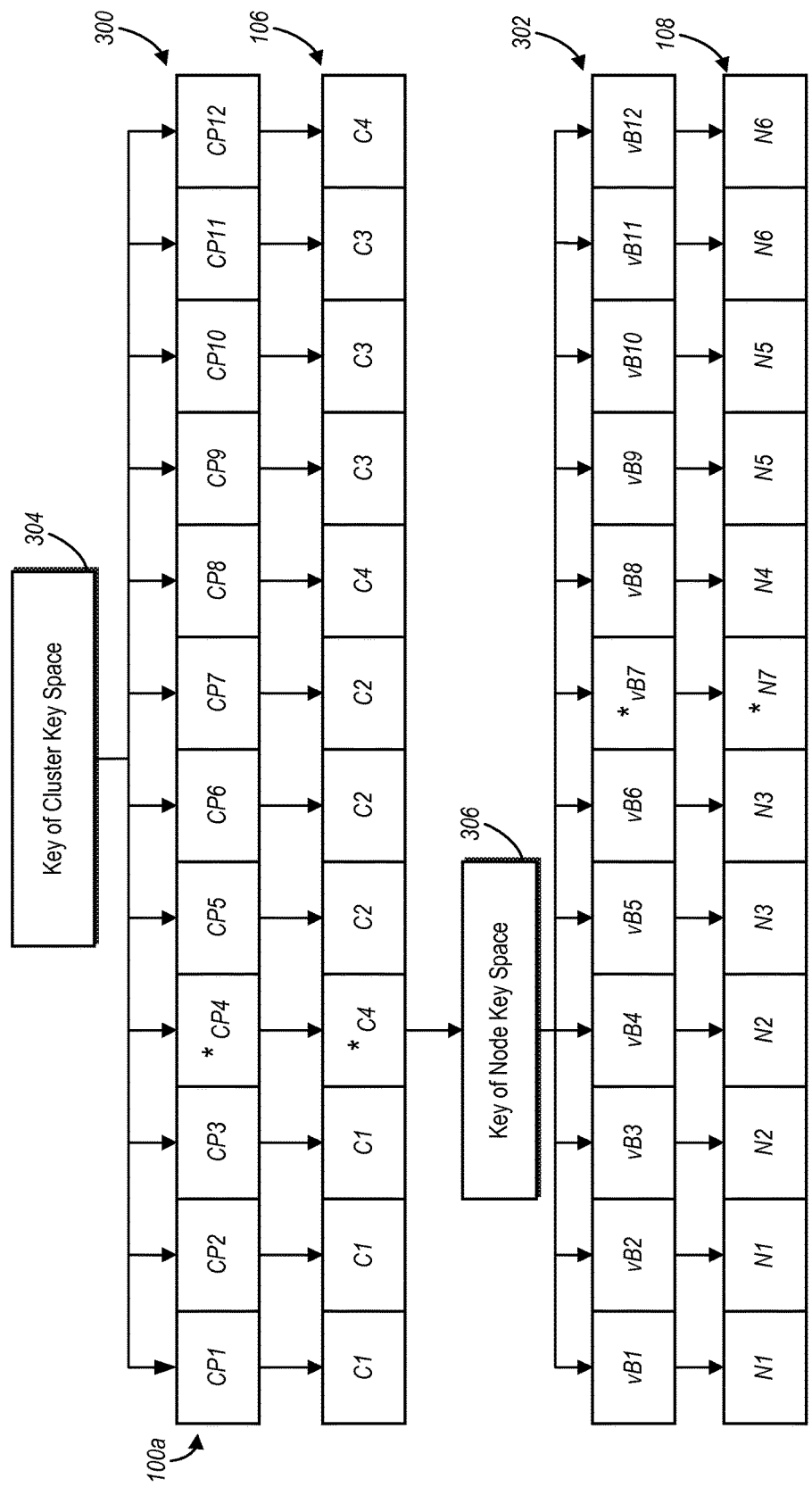
FIG. 3B illustrates a schematic representation of the multi-cluster database system and mapping scheme of FIG. 3A with an added cluster in accordance with one or more embodiments.
Figure 3C:
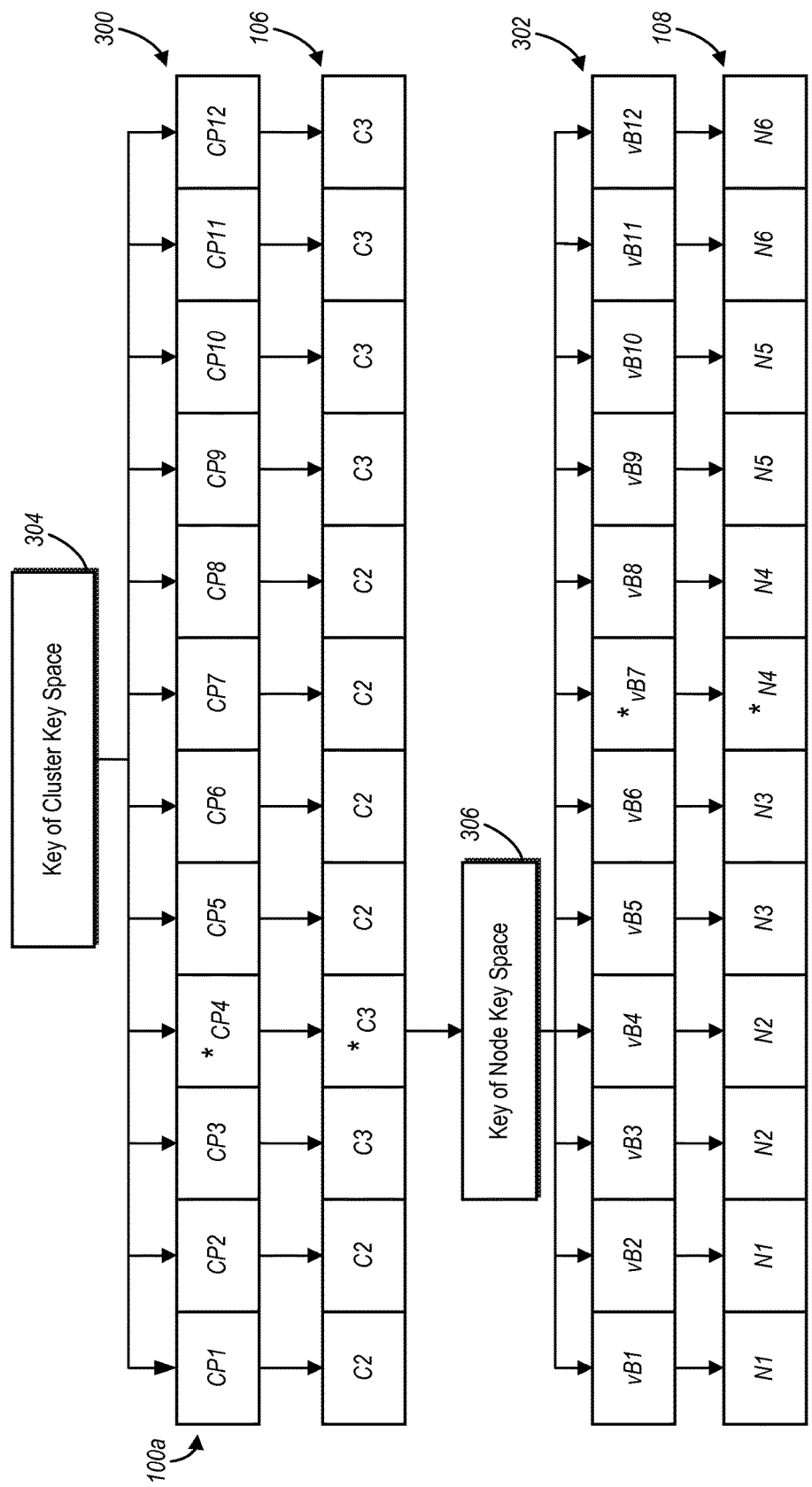
FIG. 3C illustrates a schematic representation of the multi-cluster database system and mapping scheme of FIG. 3A with a removed cluster in accordance with one or more embodiments.

FIG. 3A shows a schematic diagram illustrating one embodiment of a multi-cluster database system 100a with data distributed and managed by a multi-cluster database management system 110. FIG. 3B illustrates the multi-cluster database system 100*a* of FIG. 3A with an added cluster and re-distributed data. FIG. 3C on the other hand illustrates the multi-cluster database 100*a* of FIG. 3A with a removed cluster and re-distributed data. The following description of FIGS. 3A-3C describes a mapping scheme that the multi-cluster database management system 110 can implement to manage, distribute, and re-distribute data across the multi-cluster database system 100*a* in accordance with one or more embodiments.

FIG. 3A illustrates how the key ID mapper 206 can map data to a particular cluster 106 and then a particular node 108. The embodiment shown in FIG. 3A illustrates that the multi-cluster database system 100*a* includes twelve cluster partitions 300 (i.e., CP1-CP12) and three clusters 106 (i.e., C1-C3). In addition, and as shown in FIG. 3, cluster C1 includes twelve vBuckets 302 (i.e., vB1-vB12), six nodes 108 (i.e., N1-N6), and twelve replication nodes (i.e., N7-N18). The numbers of cluster partitions, clusters, vBuckets, nodes per cluster, and replication nodes per cluster included in the embodiment of FIG. 3A were selected for ease in describing and illustrating aspects of one or more embodiments. One will appreciate in light of the disclosure herein that in alternative embodiments the number of cluster partitions, clusters, vBuckets, nodes, and replication nodes may be larger or smaller than that the number shown in FIG. 3A.

The multi-cluster database management system 110 managing the multi-cluster database system 100*a* can receive a request from a client 102 to process a piece of data. Upon receiving the request, the key ID mapper 206 can determine a key 304 of the cluster key space, as illustrated in FIG. 3A. For example, the key ID mapper 206 can hash an ID (such as a document ID) included with the request. The key ID mapper 206 can then determine to which cluster partition 300 the key 304 is assigned. In this case, and as shown in FIG. 3A, the key ID mapper 206 determines that the key 304 maps to cluster partition CP4, as indicated by the asterisk. The key ID mapper 206 can determine that the cluster C1 hosts the cluster partition CP4 and is where the request should be sent, as indicated by the asterisk.

At this point or before, the key ID mapper 206 can determine a key 306 of the node key space, as illustrated in FIG. 3A. For example, the key ID mapper 206 can preform an additional hash on the ID included with the request to determine the key 306. Alternatively, the key ID mapper 206 can use an alternative bit range of the hash previously performed on the ID included with the request to determine the key 306. The key ID mapper 206 can then determine to which vBucket 302 the key 306 is assigned. In this case, and as shown in FIG. 3A, the key ID mapper 206 determines that the key 306 maps to vBucket vB7, as indicated by the asterisk. The key ID mapper 206 can determine that the node N4 hosts vBucket vB7 and is where the request should be sent, as indicated by the asterisk.

Once the request reaches the applicable node N4, the node N4 can respond to or otherwise perform one or more actions in response to the request. For example, if the request is a read request, the node N4 can provide the requested data to the client 102. On the other hand, if the request is a write or update request, the node N4 can write or otherwise update data stored on the node N4 using data included in the request. The asterisks included in FIGS. 3A-3C illustrate where requests for a particular piece of data will be directed in the various configurations of the multi-cluster database system 100*a*.

FIG. 3A illustrates the vBuckets 302 and nodes 108 of the cluster C1. In particular, FIG. 3A illustrates that cluster C1 can include twelve vBuckets 302 across which the entire node key space is divided. One will appreciate that each of the clusters 106 can include the same number of vBuckets 302 as cluster C1. Similarly, the entire node key space is divided across the vBuckets 302 of each cluster 106.

While each cluster 106 can include the same number of vBuckets 302, the number of nodes 108 can vary from cluster to cluster. For example, FIG. 3A illustrates that the cluster C1 includes six nodes (i.e., nodes N1-N6). The other clusters C2, C3 can include more nodes (i.e., one to five nodes), the same number of nodes (i.e., six nodes), or a greater number of nodes (i.e., more than six nodes). For example, the cluster C4 of FIG. 3B includes seven nodes rather than 6.

Additionally, as the mapping scheme of FIG. 3A illustrates, data assigned to cluster partition CP4 is evenly, or substantially evenly, distributed across all of the vBuckets 302 of cluster C1, and in turn across each of the nodes 108 of cluster C1. In other words, each vBucket vB1-vB12 of cluster C1, and thus each node N1-N6 of cluster C1, can include a portion of the data mapped to cluster partition CP4. Furthermore, each vBucket vB1-vB12 of cluster C1, and thus each node N1-N6 of cluster C1, can include a portion of the data mapped to each cluster partition assigned to cluster C1 (i.e., clusters partitions CP1, CP2, CP3, and CP4).

The multi-cluster database system 100*a* can optionally include replication nodes 308. The replication nodes 308 can store identical data or nearly identical data as another node 108. For example, each of replication nodes N7 and N8 can include the same data as node N1. The replication nodes 308 can provide data redundancy to reduce or avoid down time in the event that a node 108 fails or has technical issues. The replication nodes 308 can also provide increased data availability.

FIG. 3A illustrates that each node 108 can have two associated replication nodes 308. As such, the multi-cluster database system 100*a* can store each piece of data in three separate node locations. In alternative embodiments, each node 108 can have only one corresponding replication node 308. In yet further embodiments, each node 108 can have more than two associated replication nodes 308. Furthermore, while FIG. 3A illustrates the replication nodes 308 as separate nodes, in alternative implementations, the multi-cluster database system 100*a* can store copies or data replications of all nodes. For example, in FIG. 3A, vB1 and vB2 are both stored on N1 and both are replicated to N7 and N8. Some embodiments, however, may utilize other nodes (e.g., N2-N6), to store the replicas, eliminating the need for dedicated replica nodes. For example, the replicas of vB1 could be stored on N2 and N3, while the replicas of vB2 could be stored on N4 and N5. In this case, the copy of vB1 on N1 might be considered active or the master and all reads at writes might be directed to N1. N1 could then forward write requests for vB1 to N2 and N3 so that those replicas remain up to date.

One will appreciate in light of the disclosure herein that the multi-cluster database management system 110 can use any number of various replication schemes. For example, in one embodiment each node 108 acts as a master node and each replication node 308 acts as a slave. In such embodiment, the master nodes 108 receive and handle requests to process data (e.g., read and write requests). The slave nodes 308, on the other hand, may not receive requests to process data directly from client 102. In other words, the slave nodes 308 may be hidden from the client 102. In other implementations, client 102 can read directly from the slave nodes 308.

In alternative embodiments, the multi-cluster database management system 110 may not use primary or master nodes. In such embodiments, each node 108/308 remains a peer of all other nodes 108/308. The multi-cluster database management system 110 can direct requests to process data from the client 102 to nodes 108/308 to which the data maps. For example, in the embodiment illustrated in FIG. 3A, the multi-cluster database management system 110 can send the request to each of nodes N4, N13, and N14. All of the nodes N4, N13, N14 may not respond in order for the request to be successfully answered. In contrast, only one node N4, N13, N14 can reply to the request. The node manager 208 can update or otherwise make the nodes of N4, N13, N14, that do not respond or do not successfully respond to the request, consistent later as resources allow. For read requests, the requestor may have the option to select the consistency level of the data within the read request command. In other words, the requestor may elect to accept the data provided by first node 108 to respond, or may request that the coordinating nodes 108 verify the data against other replicated nodes 308. If the data conflicts, the multi-cluster database management system 110 can provide the latest data and update the nodes 108 and/or 308 that have the older conflicting data.

In one or more embodiments, the multi-cluster database management system 110 can rely upon the replication of data within each cluster 106 and avoid replication of data across clusters 106. For example, the multi-cluster database management system 110 can avoid replicating data in two different clusters 106. One will appreciate that the lack of redundancy or replication of data between clusters 106 can reduce the need for the clusters 106 to communicate. The reduction of cluster cross talk can reduce latency and otherwise increase the speed and performance of the multi-cluster database system 100a. Along related lines, the lack of replication of data among clusters 106 can reduce the need to ensure data consistency between clusters 106.

As mentioned previously, the multi-cluster database management system 110 can allow for the scaling or resizing of a database system 100 in order to meet increased or decreased storage and/or processing needs. Specifically, an administrator of the multi-cluster database management system 110 can determine that the multi-cluster database system 100a would benefit from the addition of an additional cluster 106. As shown by a comparison of FIG. 3B to FIG. 3A, an administrator can add the hardware (i.e., nodes 108) forming a cluster C4 to the multi-cluster database system 100a.

Upon the addition of the cluster C4 to the multi-cluster database system 100a, the cluster partition manager 202 can re-distribute the cluster partitions 300 among the increased number of clusters 106, as shown by FIG. 3B. In particular, the cluster partition manager 202 can evenly or substantially evenly distribute the cluster partitions 300 among the clusters C1-C4. As shown by FIG. 3B, the cluster partition manager 202 can assign cluster partitions CP4, CP8, and CP12 to new cluster C4. In this example, database system 100 has gone from three clusters 106, each with four cluster partitions 300, to four clusters 106, each with three cluster partitions 300.

In one or more embodiments, the cluster partition manager 202 can re-distribute the cluster partitions 300 among the increased number of clusters 300 in a manner to minimize the movement or switching of cluster partitions 300 between clusters 106. For example, FIG. 3B illustrates that only three cluster partitions 300 were re-assigned to a different cluster 106 (i.e., cluster partitions CP4, CP8, and CP12). One will appreciate in light of the disclosure herein that minimizing the switching of cluster partitions 300 can reduce or minimize associated transfers of data. Reducing the transfer of data during rebalancing of the multi-cluster database system 100a can reduce latency and the number of double reads during the transfer process.

After the cluster partition manager 202 has re-assigned the cluster partitions 300, the data mover 210 can transfer data between clusters 106 accordingly. As shown by FIG. 3B, the data mover 210 can transfer all the data assigned to cluster partition CP4 from cluster C1 to cluster C4. More specifically, the data mover 210 can transfer all of the data in node N4 assigned cluster partition CP4 (which will also be assigned to vBucket vB7) to the node in cluster C4 to which vBucket vB7 is assigned (i.e., N7). One will appreciate that data moved between clusters 300 will remain in the same vBucket before and after transfer. Along similar lines, the data mover 210 can transfer all of the data assigned to cluster partition CP8 from cluster C2 to cluster C4, and all of the data assigned to cluster partition CP12 from cluster C3 to cluster C4.

During the transfer of data of a cluster partition CP4 from one cluster C1 to another cluster C4, the cluster partition manager 202 can rename the cluster partition on the transferring cluster (i.e., C1). If a client 102 attempts to process data (read, write, or otherwise access) assigned to cluster partition C4 and is directed to cluster C1, the attempt can fail. In such instances, the client partition manager 202 can recognize that a transfer of data is taking place, obtain the new location of the requested data, and direct the request to the new location. Alternatively, during a transfer of data, the client partition manager 202 can control data requests so they are directed in parallel to the old cluster C1 and the new cluster C4. Still further, the client partition manager 202 can direct requests to the new cluster C4 first, and if the data is not found, re-direct the request to the old cluster C1. In any event, once the data mover 210 has completed the transfer, the multi-cluster database management system 110 can delete the renamed cluster partition from the old cluster C1.

Along related lines, the multi-cluster database management system 110 can implement a locking function during the transfer of data. By implementing a locking function, the multi-cluster database management system 110 can help ensure consistency of data before and after the transfer. In particular, the multi-cluster database management system 110 can use a locking function to avoid a situation in which a first client attempts to read data on the new cluster C4, but because the data is not found at cluster C4, the first client reads the data from the old cluster C1. Meanwhile a second client updates the data on the new cluster C4, resulting in the first client having an out-of-date record. In order to avoid such double reads, the multi-cluster database management system 110 can always issue requests to the new cluster C4. If the data is not yet located on the new cluster C4, the multi-cluster database management system 110 can redirect the request to the old cluster C1 (the redirect can be hidden from the requesting client) and keep the data locked as appropriate. Furthermore, the multi-cluster database management system 110 can issue a lock for the data intended for the new cluster C4, even though the data is not yet on the new cluster C4. Additionally or alternatively, rather than locking the data, the multi-cluster database management system 110 can update data by incrementing or replacing values in a manner hidden from the client.

After the transfer of the data to the new cluster C4, the multi-cluster database management system 110 can receive a second request from the client 102 to process the piece of data referenced in relation to FIG. 3A. Upon receiving the second request, the key ID mapper 206 can determine the key 304 of the cluster key space. For example, the key ID mapper 206 can hash an ID (such as a document ID) included with the request. The key ID mapper 206 can then determine to which cluster partition 300 the key 304 is assigned. In this case the key ID mapper 206 determines that the key 304 maps to cluster partition CP4, as indicated by the asterisk. The key ID mapper 206 can determine that the cluster C4 now hosts the cluster partition CP4, and cluster C4 is now where the request should be sent, as indicated by the asterisk.

At this point or before, the key ID mapper 206 can determine the key 306 of the node key space. For example, the key ID mapper 206 can preform an additional hash on the ID included with the request to determine the key 306. Alternatively, the key ID mapper 206 can use an alterative bit range of the hash previously performed on the ID included with the request to determine the key 306. The key ID mapper 206 can then determine to which vBucket 302 the key 306 is assigned. In this case, the key ID mapper 206 again determines that the key 306 maps to vBucket vB7, as indicated by the asterisk. The key ID mapper 206 can determine that the node N7 now hosts vBucket vB7 and is where the request should be sent, as indicated by the asterisk.

As mentioned previously, the multi-cluster database management system 110 can allow for the downsizing a database system 100. Specifically, an administrator or the multi-cluster database management system 110 can determine that the multi-cluster database system 100a would benefit from the removal of a cluster 106. As shown by a comparison of FIG. 3C to FIG. 3A, an administrator can remove the hardware (i.e., nodes) forming a cluster C1 from the multi-cluster database system 100a.

Upon the removal of the cluster C1 from the multi-cluster database system 100a, the cluster partition manager 202 can re-distribute the cluster partitions 300 among the reduced number of clusters 106 as shown by FIG. 3C. In particular, the cluster partition manager 202 can evenly or substantially evenly distribute the cluster partitions 300 among the clusters C2 and C3. As shown by FIG. 3C, the cluster partition manager 202 can assign cluster partitions CP1 and CP2 to cluster C2 and cluster partitions CP3 and CP4 to cluster C3. Similar to the example of adding a cluster 106, the cluster partition manager 202 can re-distribute the cluster partitions 300 among the reduced number of clusters 106 in a manner to minimize the movement or switching of cluster partitions 300 between clusters 106.

After the cluster partition manager 202 has re-assigned the cluster partitions 300, the data mover 210 can transfer data between clusters 106 accordingly. A shown by FIG. 3C, the data mover 210 can transfer all the data assigned to cluster partition CP4 from cluster C1 to cluster C3. More specifically, the data mover 210 can transfer all of the data in vBucket vB7 assigned to cluster partition CP4 (which is stored on node N4) to the node in cluster C3 to which vBucket vB7 is assigned (i.e., N4). One will appreciate that data moved between clusters 106 will remain in the same vBucket before and after transfer. Along similar lines, the data mover 210 can transfer all of the data assigned to cluster partition CP3 from cluster C1 to cluster C3, and all of the data assigned to cluster partitions CP1 and CP2 from cluster C1 to cluster C2.

After the transfer of the data to the clusters C2 and C3, the multi-cluster database management system 110 can receive an additional request from the client 102 to process the piece of data referenced in relation to FIG. 3A. Upon receiving the second request, the key ID mapper 206 can determine the key 304 of the cluster key space. For example, the key ID mapper 206 can hash an ID (such as a document ID) included with the request. The key ID mapper 206 can then determine to which cluster partition 300 the key 304 is assigned. In this case the key ID mapper 206 determines that the key 304 maps to cluster partition CP4, as indicated by the asterisk. The key ID mapper 206 can determine that the cluster C3 now hosts the cluster partition CP4 and is where the request should be sent, as indicated by the asterisk.

At this point or before, the key ID mapper 206 can determine the key 306 of the node key space. For example, the key ID mapper 206 can preform an additional hash on the ID included with the request to determine the key 306. Alternatively, the key ID mapper 206 can use an alterative bit range of the hash previously performed on the ID included with the request to determine the key 306. The key ID mapper 206 can then determine to which vBucket 302 the key 306 is assigned. In this case, the key ID mapper 206 again determines that the key 306 maps to vBucket vB7, as indicated by the asterisk. The key ID mapper 206 can determine that the node N4 now hosts vBucket vB7 and is where the request should be sent, as indicated by the asterisk.

While FIGS. 3A-3C illustrate a multi-cluster database system 100a including a vBucket node organization/data distribution scheme, the present invention is not limited to a vBucket node organization/data distribution scheme. In alternative implementations, the nodes may be organized in accordance with any suitable database protocol, such as those previously mentioned.

Figure 4:
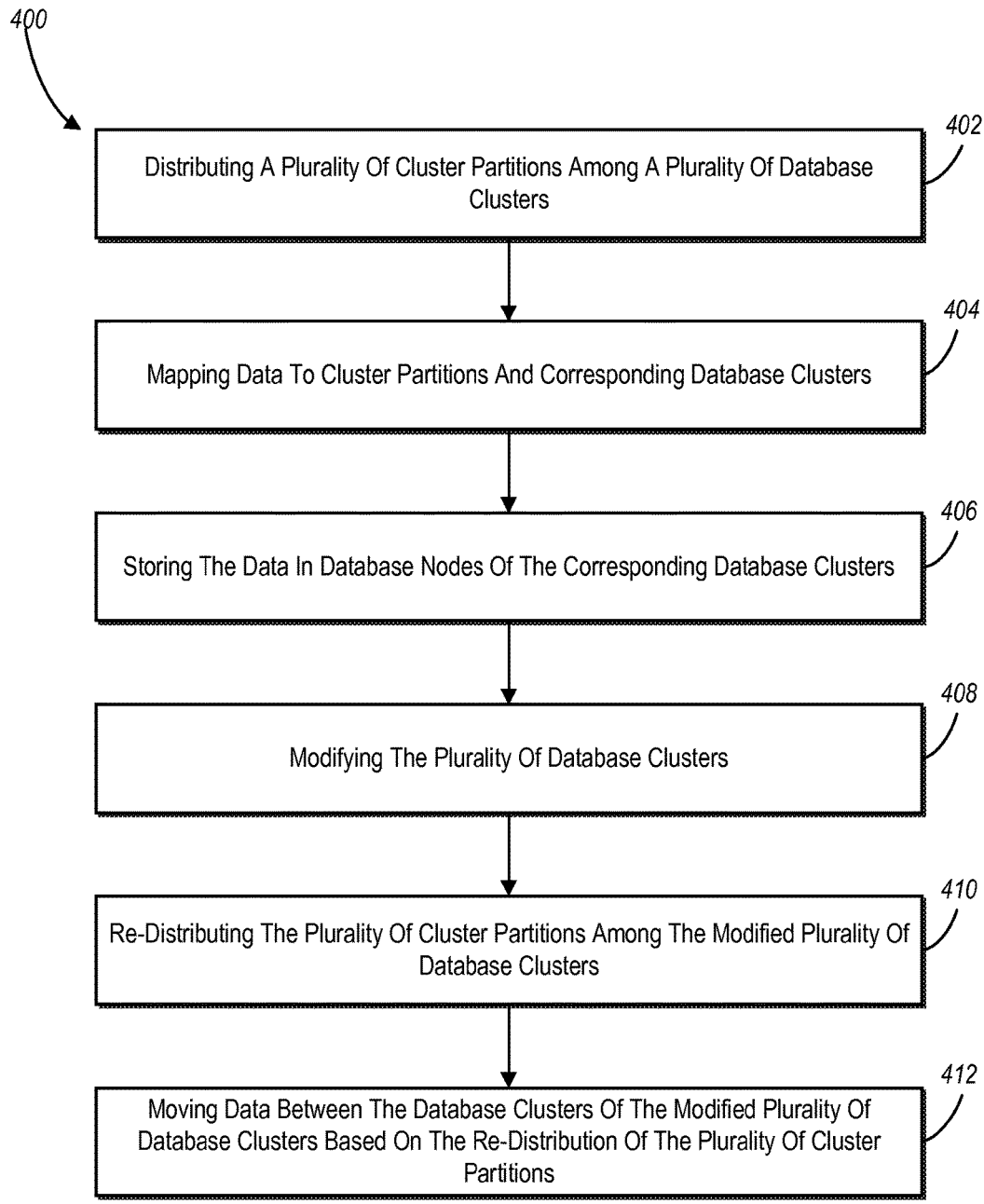
FIG. 4 illustrates a flowchart of a series of acts in a method of managing a multi-cluster database in accordance with one or more embodiments.
Figure 5:
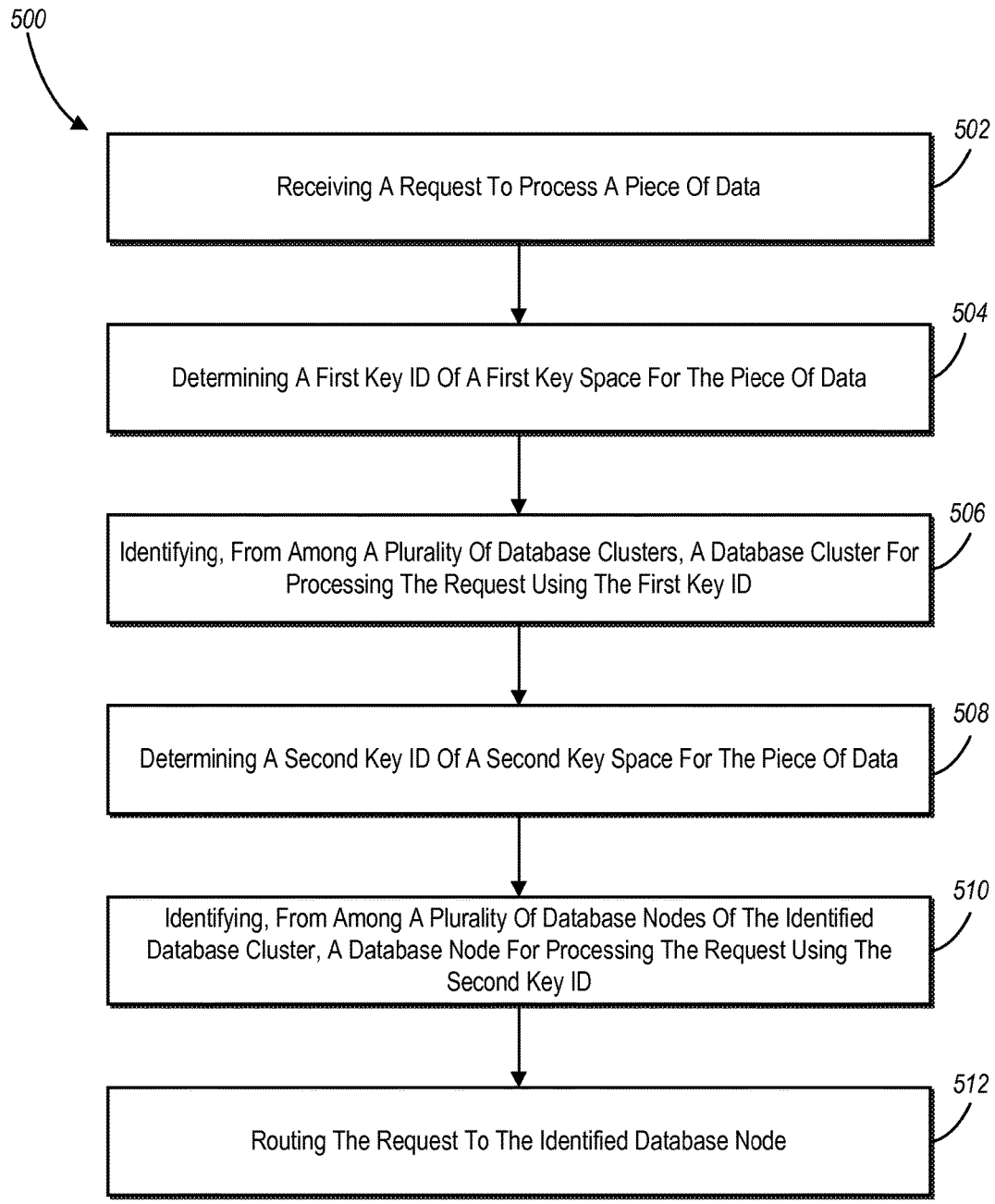
FIG. 5 illustrates a flowchart of a series of acts in a method of managing data within a multi-cluster database in accordance with one or more embodiments.

FIGS. 1-3C, the corresponding text, and the examples, provide a number of different systems and devices for managing a multi-cluster database. In addition to the foregoing, embodiments also can be described in terms of flowcharts comprising acts and steps in a method for accomplishing a particular result. For example, FIGS. 4 and 5 illustrate flowcharts of exemplary methods in accordance with one or more embodiments. The methods described in relation to FIGS. 4 and 5 may be performed with less or more steps/acts or the steps/acts may be performed in differing orders. Additionally, the steps/acts described herein may be repeated or performed in parallel with one another or in parallel with different instances of the same or similar steps/acts.

FIG. 4 illustrates a flowchart of one exemplary method 400 of managing a multi-cluster database system 100, 100a. The method 400 includes an act 402 of distributing a plurality of cluster partitions 300 among a plurality of database clusters 106. Each database cluster 106 can include a plurality of database nodes 108. In particular, act 402 can involve assigning each cluster partition CP1-CP12 of the plurality of cluster partitions 300 to a database cluster 106a, 106b, C1-C4 of the plurality of database clusters 106. For example, act 402 can involve evenly or substantially evenly dividing the plurality of cluster partitions 300 among the plurality of database clusters 106 such that each database cluster 106a, 106b, C1-C4 is assigned the same number of cluster partitions CP1-CP12 to the extent possible. Act 402 can further involve listing the assignments of the cluster partitions CP1-CP12 to the database clusters 106a, 106b, C1-C4 in a table or mapping scheme.

Method 400 also includes an act 404 of mapping data to cluster partitions CP1-CP12 of the plurality of cluster partitions 300 and corresponding database clusters 106a, 106b, C1-C4. As part of act 404 or another act, method 400 can involve assigning key IDs 304 of a first key space to the cluster partitions CP1-CP12 of the plurality of cluster partitions 300. Furthermore, method 400 can involve assigning each cluster partition CP1-CP12 of the plurality of cluster partitions 300 a key ID or a range of key IDs 304 of a first key space. For example, method 400 can involve evenly or substantially evenly dividing the first key space among the plurality of cluster partitions 300 such that each cluster partition CP1-CP12 is assigned the same number of key IDs 304 to the extent possible. More specifically, in one or more embodiments, method 400 can involve assigning a single key ID 304 to each cluster partition CP1-CP12. Method 400 can further involve listing the assignments of the key IDs of the first key space 304 to the cluster partitions CP1-CP12 in a table or mapping scheme.

Method 400 can additionally involve defining the first key space as the possible values of a range associated with document or data IDs or the possible values of a first set of bits of a hash of the document or data IDs. In particular, method 400 can involve defining the first key space as the possible values of a pre-determined number of bits of a cryptographically secure hash, such as a MD5 hash. Method 400 can optionally involve determining the pre-determined number of bits for the basis of the first key space so as to produce a desired number of key IDs in the first key space. For example, method 400 can involve selecting 10 bits of the hash to produce 1024 key IDs, selecting 9 bits of the hash to produce 512 key IDs, or selecting 8 bits of the hash to produce 256 key IDs, etc.

In any event, act 404 can involve identifying an identifier associated with a piece of data. For example, act 404 can involve identifying a document ID or other identifier(s) included associated with the piece of data. Act 404 can further involve determining a key ID of the first key space 304 for the piece of data based on the identifier. For instance, act 404 can involve performing a hash on the identifier and calculating the key ID of the first key space 304 using a first set of bits of the hash. Additionally, act 404 can involve identifying a cluster partition CP4 of the plurality of cluster partitions 300 to which the key ID of the first key space 304 is assigned. Furthermore, act 404 can involve identifying a database cluster C1 of the plurality of database clusters 106 to which the identified cluster partition CP4 is assigned.

As part of act 404 or another act, method 400 can involve assigning key IDs 306 of a second key space to the nodes 108 forming each of the database clusters C1-C4, 106. More specifically, method 400 can involve directly or indirectly assigning each node N1-N6 of the plurality of nodes 108 a key ID or a range of second key IDs 306 of the second key space. For example, method 400 can involve evenly or substantially evenly dividing the second key space directly or indirectly among the plurality of nodes 106 such that each node N1-N6 is assigned the same number of key IDs 306 to the extent possible. Method 400 can further involve listing the assignments of the key IDs of the second key space 306 to the nodes N1-N6 in a table or mapping scheme.

In at least one embodiment, method 400 can involve assigning the key IDs of the second key space 306 indirectly to the nodes N1-N6. In particular, method 400 can involve assigning the key IDs of the second key space 306 to vBuckets vB1-vB12 and assigning the vBuckets vB1-vB12 to the nodes N1-N6. For example, method 400 can involve distributing the key IDs of the second key space 306 evenly or substantially evenly to the vBuckets vB1-vB12 such that each vBucket is assigned the same number of key IDs 306 to the extent possible. Method 400 can also involve can involve distributing the vBuckets vB1-vB12 evenly or substantially evenly to the nodes N1-N6 such that each node N1-N6 is assigned the same number of vBuckets vB1-vB12 to the extent possible.

The method 400 can also involve defining the second key space as the possible values of a range associated with document or data IDs or the possible values of a second set of bits of a hash of the document or data IDs. In particular, method 400 can involve defining the second key space as the possible values of a pre-determined number of bits of a cryptographically secure hash, such as a MD5 hash. Method 400 can optionally involve determining the pre-determined number of bits for the basis of the second key space so as to produce a desired number of key IDs in the second key space. For example, method 400 can involve selecting 10 bits of the hash to produce 1024 key IDs, selecting 9 bits of the hash to produce 512 key IDs, or selecting 8 bits of the hash to produce 256 key IDs, etc. Furthermore, act 400 can involve using the same hash to define the first key space and the second key space. In such embodiments, act 400 can involve using different bits of the hash to define the second key space than the bits used to define the first key space. Alternatively, method 400 can involve using a different hash to define the first key space than the hash used to define the second key space.

In any event, act 404 can further involve identifying an identifier associated with a piece of data. For example, act 404 can involve determining a key ID of the second key space 306 for the piece of data based on the identifier. For instance, act 404 can also involve performing the hash on the identifier and calculating the key ID of the second key space 306 using a second set of bits of the hash. Additionally, act 404 can involve identifying the database node N4 of the identified database cluster C1 to which the key ID of the second key space 306 is assigned. For example, act 404 can involve identifying a vBucket vB7 of the plurality of vBuckets 302 to which the identified key ID of the second key space 306 is assigned. In such embodiments, act 404 can further involve identifying the database node N4 of the identified database cluster C1 upon which the identified vBucket vB7 is hosted.

FIG. 4 further illustrates that method 400 can include an act 406 of storing the data in database nodes N1-N18 of the corresponding database clusters C1-C4. For example, act 406 can involve directing the data to the database cluster C1 upon which is hosted the cluster partition CP4 to which the first key ID 304 associated with the data is assigned. Act 406 can further involve routing the data to the database node N4 of the database cluster C1 to which the second key ID 306 is assigned.

Method 400 can also include an act 408 of modifying the plurality of database clusters 106 by adding or removing one or more database clusters C1, C4. For example, act 408 can involve associating a database cluster C4 of database nodes N1-N7 installed by an administrator with the multi-cluster database system 100, 100a. In particular, act 408 can involve adding the database cluster C4 of database nodes N1-N7 to a table or mapping scheme for the multi-cluster database system 100, 100a. Act 408 can further comprise distributing the updated table or mapping scheme to one or more database clusters 106 and database nodes 108 of the multi-cluster database system 100, 100a.

Additionally, method 400 can include an act 410 of re-distributing the plurality of cluster partitions 300 among the modified plurality of database clusters 106. For example, act 410 can involve assigning each cluster partition CP1-CP12 of the plurality of cluster partitions 300 to a database cluster C1-C4, C2-C3 of the modified plurality of database clusters. For example, act 410 can involve evenly or substantially evenly dividing the plurality of cluster partitions 300 among the modified plurality of database clusters 106 such that each database cluster C1-C4, C2-C3 is assigned the same number of cluster partitions CP1-CP12 to the extent possible. As a specific example, act 410 can involve re-assigning the identified cluster partition CP4 from the identified database cluster C1 to another database cluster C3, C4 of the plurality of database clusters 106. Additionally, act 410 can involve updating the assignments of the cluster partitions CP1-CP12 to the database clusters C1-C4, C2-C3 in the table or mapping scheme of the multi-cluster database system 100, 100a.

In addition to the foregoing, method 400 can include an act 412 of moving at least a portion of the data of the dataset between the database clusters C1-C4, C2-C3 of the modified plurality of database clusters based on the re-distribution of the plurality of cluster partitions CP1-CP12. For example, act 412 can involve transferring data assigned based on key IDs of the first key ID space to cluster partitions CP4, CP12, CP1-CP4 re-assigned to new/different database clusters C2, C3, C4 during the redistribution of the plurality of cluster partitions 300. For example, act 412 can involve moving the piece of data from the identified database node N4 of the identified database cluster C1 to another database node N7 of the database cluster C4.

Referring now to FIG. 5, a flowchart of another exemplary method 500 of managing data within a multi-cluster database system is illustrated. As shown the method 500 includes an act 502 of receiving a request to process a piece of data. In particular, act 502 can involve receiving a request including an identifier of a piece of data to be processed. For example, act 502 can involve receiving a document or user ID along with a request to read, write, or otherwise interact with a piece of data.

The method 500 can also include an act 504 of determining a first key ID of a first key space 304 for the piece of data based on the associated identifier. For instance, act 504 can involve performing a hash on the identifier and calculating the key ID of the first key space 304 using a first set of bits of the hash. Alternatively, act 504 can involve identifying a first letter or number of the associated identifier.

FIG. 5 further illustrates that method 500 includes an act 506 of identifying, from among a plurality of database clusters 106, a database cluster C1 for processing the request using the first key ID 304. For example, act 506 can involve identifying a cluster partition CP4 of a plurality of cluster partitions 300 to which the key ID of the first key space 304 is assigned. Furthermore, act 506 can involve identifying a database cluster C1 of the plurality of database clusters 106 to which the identified cluster partition CP4 is assigned. Act 506 can optionally involve consulting a table or mapping scheme of the multi-cluster database system 100, 100a.

Furthermore, the method 500 includes an act 508 of determining a second key ID 306 of a second key space for the piece of data based on the associated identifier. For instance, act 508 can also involve performing the hash on the identifier and calculating the key ID of the second key space 306 using a second set of bits of the hash. Act 508 can involve using the same hash used to determine the first key ID 304 of the first key space to determine the second key ID 306 of the second key space. In such embodiments, act 508 can involve using different bits of the hash to define the second key space than the bits used to define the first key space. Alternatively, act 508 can involve using a different hash to define the first key space than the hash used to define the second key space. In further embodiments, act 508 can involve identifying a first or last letter or number of the associated identifier.

As illustrated by FIG. 5, the method 500 also includes an act 510 of identifying, from among a plurality of database nodes 108 of the identified database cluster C1, a database node N4 for processing the request using the second key ID 306. For example, act 508 can involve identifying a vBucket vB7 of a plurality of vBuckets 302 to which the identified key identifier of the second key space 306 is assigned. In such embodiments, act 508 can further involve identifying the database node N4 of the identified database cluster C1 upon which the identified vBucket vB7 is hosted.

In addition to the foregoing, the method 500 can include an act 512 of routing the request to the identified database node N4 of the identified database cluster C1. The database node N4 can then respond to the request by writing data, reading data, or otherwise manipulating the data hosted thereon. As part of processing the request, the database node N4 can return a response to the client 102, such as data requested by the client 102.

Method 500 can further involve modifying the plurality of database clusters 106 by adding or removing one or more database clusters C1, C4 from the plurality of database clusters 106. For example, method 500 can involve adding database cluster C4 and the database nodes N1-N6 associated therewith to the multi-cluster database system 100a. Alternatively, the method can involve removing database cluster C1 and the database nodes N1-N6 associated therewith from the multi-cluster database system 100a.

After modification of the multi-cluster database system 100a, method 500 can involve balancing the plurality of cluster partitions 300 across the modified plurality of database clusters 106. For example, method 500 can involve evenly or substantially evenly dividing the plurality of cluster partitions 300 among the modified plurality of database clusters 106 such that each database cluster C1-C4, C2-C3 is assigned the same number of cluster partitions CP1-CP12 to the extent possible. In particular, method 500 can involve re-assigning the identified cluster partition CP4 from the identified database cluster C1 to another database cluster C3, C4 of the modified plurality of database clusters 300.

Method 500 can additionally involve receiving a second request to process the piece of data. Upon receipt of the second request, method 500 can involve identifying that the identified cluster partition CP1 to which the first key ID 304 is assigned is hosted by the another database cluster C3, C4 of the modified plurality of database clusters 106. Method 500 can involve identifying, from among a plurality of database nodes N1-N7 of another database cluster C3, C4, a second database node N4, N7 for processing the second request using the second key ID 306. Method 500 can then involve routing the second request to the identified second database node N4, N7 of another database cluster C3, C4.

One or more embodiments may comprise or utilize a special purpose or general-purpose computer including computer hardware, such as, for example, one or more processors and system memory, as discussed in greater detail below. One or more embodiments also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, one or more embodiments can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be implemented in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. In some embodiments, computer-executable instructions are executed on a general-purpose computer to turn the general-purpose computer into a special purpose computer implementing elements of the multi-cluster database system. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

One or more embodiments can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 6:
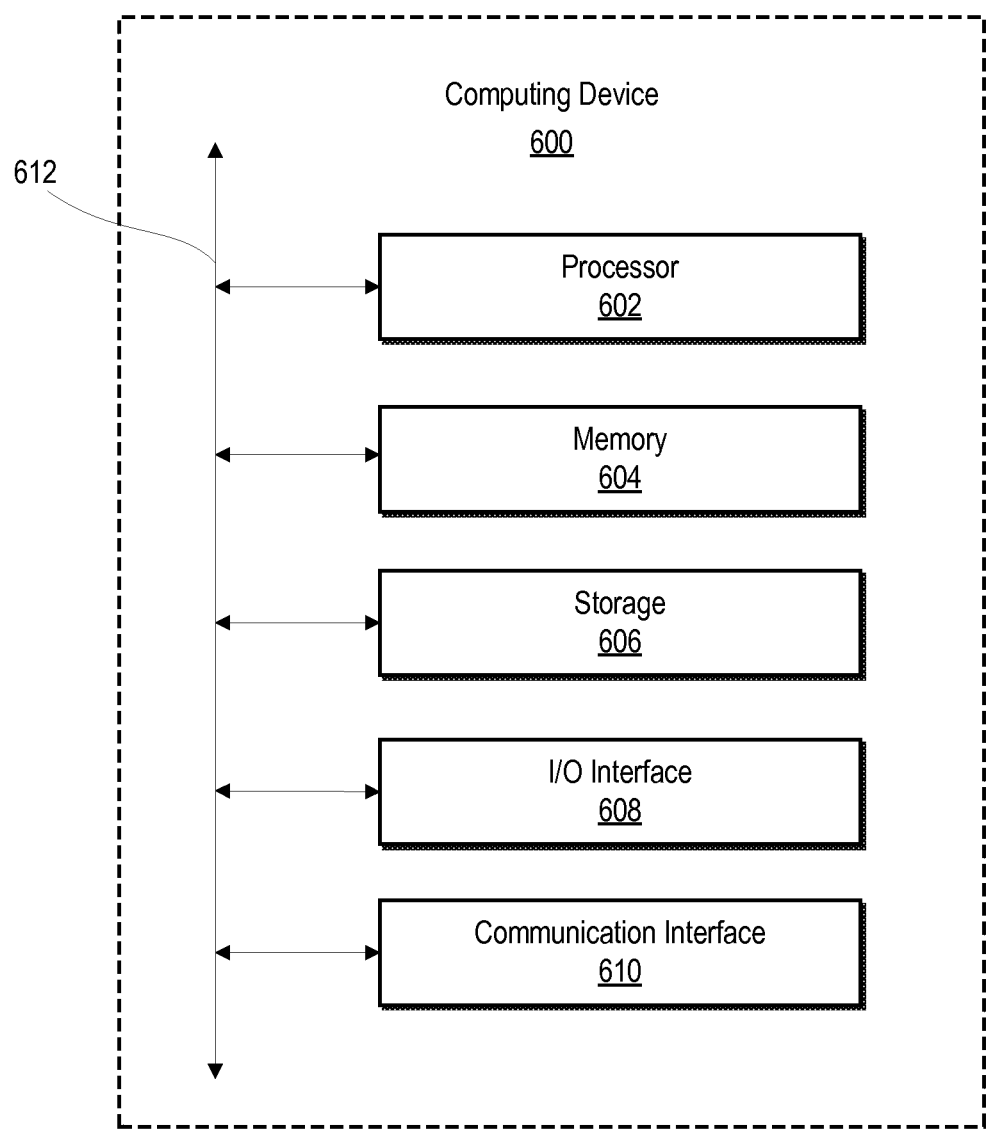
FIG. 6 illustrates a block diagram of an exemplary computing device in accordance with one or more embodiments.

FIG. 6 illustrates, in block diagram form, an exemplary computing device 600 that may be configured to perform one or more of the processes described above. One will appreciate that the client 102 (or even the database system 100) can comprise implementations of the computing device 600. As shown by FIG. 6, the computing device can comprise a processor 602, memory 604, a storage device 606, an I/O interface 608, and a communication interface 610. While an exemplary computing device 600 is shown in FIG. 6, the components illustrated in FIG. 6 are not intended to be limiting. Additional or alternative components may be used in other embodiments. Furthermore, in certain embodiments, a computing device 600 can include fewer components than those shown in FIG. 6. Components of computing device 600 shown in FIG. 6 will now be described in additional detail.

In particular embodiments, processor(s) 602 includes hardware for executing instructions, such as those making up a computer program. As an example and not by way of limitation, to execute instructions, processor(s) 602 may retrieve (or fetch) the instructions from an internal register, an internal cache, memory 604, or a storage device 606 and decode and execute them. In particular embodiments, processor(s) 602 may include one or more internal caches for data, instructions, or addresses. As an example and not by way of limitation, processor(s) 602 may include one or more instruction caches, one or more data caches, and one or more translation lookaside buffers (TLBs). Instructions in the instruction caches may be copies of instructions in memory 604 or storage 606.

The computing device 600 includes memory 604, which is coupled to the processor(s) 602. The memory 604 may be used for storing data, metadata, and programs for execution by the processor(s). The memory 604 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 604 may be internal or distributed memory.

The computing device 600 includes a storage device 606, which includes storage for storing data or instructions. As an example and not by way of limitation, storage device 606 can comprise a non-transitory storage medium described above. The storage device 606 may include a hard disk drive (HDD), a floppy disk drive, flash memory, an optical disc, a magneto-optical disc, magnetic tape, or a Universal Serial Bus (USB) drive or a combination of two or more of these. Storage device 606 may include removable or non-removable (or fixed) media, where appropriate. Storage device 606 may be internal or external to the computing device 600. In particular embodiments, storage device 606 is non-volatile, solid-state memory. In particular embodiments, Storage device 606 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The computing device 600 also includes one or more input or output ("I/O") devices/interfaces 608, which are provided to allow a user to provide input to (such as user keystrokes), receive output from, and otherwise transfer data to and from the computing device 600. These I/O devices/interfaces 608 may include a mouse, keypad or a keyboard, a touch screen, camera, optical scanner, network interface, modem, other known I/O devices or a combination of such I/O devices/interfaces 608. The touch screen may be activated with a stylus or a finger.

The I/O devices/interfaces 608 may include one or more devices for presenting output to a user, including, but not limited to, a simple text-based terminal, a graphics engine, a display (e.g., a display screen), one or more output drivers (e.g., display drivers), a printer, one or more audio speakers, and one or more audio drivers. In certain embodiments, devices/interfaces 608 is configured to provide graphical data to a display for presentation to a user. The graphical data may be representative of one or more graphical user interfaces and/or any other graphical content as may serve a particular implementation.

The computing device 600 can further include a communication interface 610. The communication interface 610 can include hardware, software, or both. The communication interface 610 can provide one or more interfaces for communication (such as, for example, packet-based communication) between the computing device and one or more other computing devices 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI.

This disclosure contemplates any suitable network and any suitable communication interface 610. As an example and not by way of limitation, computing device 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computing system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof. Computing device 600 may include any suitable communication interface 610 for any of these networks, where appropriate.

The computing device 600 can further include a bus 612. The bus 612 can comprise hardware, software, or both that couples components of computing device 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

In the foregoing specification, the invention has been described with reference to specific exemplary embodiments thereof. Various embodiments and aspects of one or more embodiments are described with reference to details discussed herein, and the accompanying drawings illustrate the various embodiments. The description above and drawings are illustrative of one or more embodiments and are not to be construed as limiting the invention. Numerous specific details are described to provide a thorough understanding of various embodiments.

The present invention may be embodied in other specific forms without departing from its spirit or essential characteristics. The described embodiments are to be considered in all respects only as illustrative and not restrictive. The scope is, therefore, indicated by the appended claims rather than by the foregoing description. All changes that come within the meaning and range of equivalency of the claims are to be embraced within their scope.

I claim:

1. A method of managing a multi-cluster database comprising:
   distributing a plurality of cluster partitions among a plurality of database clusters, each database cluster including a plurality of database nodes;
   allocating a node key space among the plurality of database nodes of each database cluster of the plurality of database clusters;
   storing data in the database nodes of the corresponding database clusters by identifying an assigned database cluster of the plurality of database clusters based on the plurality of cluster partitions and identifying an assigned node of the assigned database cluster based on the node key space;

modifying the plurality of database clusters by adding or removing one or more database clusters;

re-distributing the plurality of cluster partitions among the modified plurality of database clusters while maintaining the allocation of the node key space among the plurality of database nodes of each database cluster of the plurality of database clusters; and moving, by at least one processor, at least a portion of the data between the modified plurality of database clusters based on the re-distribution of the plurality of cluster partitions.

2. The method as recited in claim 1, further comprising assigning key identifiers of a cluster key space to the cluster partitions of the plurality of cluster partitions.

3. The method as recited in claim 2, further comprising mapping data to cluster partitions of the plurality of cluster partitions and corresponding database clusters by performing steps comprising:

identifying an identifier associated with a piece of data;

determining a key identifier of the cluster key space for the piece of data based on the identifier;

identifying a cluster partition of the plurality of cluster partitions to which the key identifier of the cluster key space is assigned; and identifying a database cluster of the plurality of database clusters to which the identified cluster partition is assigned.

4. The method as recited in claim 3, further comprising assigning key identifiers of the node key space to the plurality of database nodes of each database cluster.

5. The method as recited in claim 4, further comprising mapping the piece of data to a database node of the identified database cluster, wherein mapping the piece of data to the database node of the identified database cluster comprises:

determining a key identifier of the node key space for the piece of data based on the identifier; and identifying the database node of the identified database cluster to which the key identifier of the node key space is assigned.

6. The method as recited in claim 5, wherein:

determining the key identifier of the cluster key space for the piece of data based on the identifier comprises performing a hash on the identifier and calculating the key identifier of the cluster key space using a first set of bits of the hash; and determining the key identifier of the node key space for the piece of data based on the identifier comprises calculating the key identifier of the node key space using a second set of bits of the hash.

7. The method as recited in claim 5, wherein re-distributing the plurality of cluster partitions among the modified plurality of database clusters comprises re-assigning the identified cluster partition from the identified database cluster to another database cluster of the plurality of database clusters.

8. The method as recited in claim 7, wherein moving at least a portion of the data between the modified plurality of database clusters based on the re-distribution of the plurality of cluster partitions comprises moving the piece of data from the identified database node of the identified database cluster to another database node of the another database cluster.

9. The method as recited in claim 4, wherein assigning key identifiers of the node key space to the plurality of database nodes of each database cluster comprises indirectly assigning the key identifiers of the node key space to the plurality of database nodes.

10. A system comprising:

at least one processor; and at least one non-transitory computer readable storage medium storing instructions thereon that, when executed by the at least one processor, cause the system to:

distribute a plurality of cluster partitions among a plurality of database clusters, each database cluster including a plurality of database nodes;

allocate a node key space among the plurality of database nodes of each database cluster of the plurality of database clusters;

store data in the database nodes of the corresponding database clusters by identifying an assigned database cluster of the plurality of database clusters based on the plurality of cluster partitions and identifying an assigned node of the assigned database cluster based on the node key space;

modify the plurality of database clusters by adding or removing one or more database clusters;

re-distribute the plurality of cluster partitions among the modified plurality of database clusters while maintaining the allocation of the node key space among the plurality of database nodes of each database cluster of the plurality of database clusters; and balance the data across the modified plurality of database clusters based on the re-distribution of the plurality of cluster partitions.

11. The system as recited in claim 10, wherein the instructions, when executed by the at least one processor, cause the system to balance the data across the modified plurality of database clusters by moving at least a portion of the data between the database clusters of the modified plurality of database clusters based on the re-distribution of the plurality of cluster partitions.

12. The system as recited in claim 10, wherein the instructions, when executed by the at least one processor, cause the system to map the data to cluster partitions of the plurality of cluster partitions and corresponding database clusters by:

identifying an identifier associated with a piece of data;

determining a key identifier of a cluster key space for the piece of data based on the identifier;

identifying a cluster partition of the plurality of cluster partitions to which the key identifier of the cluster key space is assigned;

identifying a database cluster of the plurality of database clusters to which the identified cluster partition is assigned;

determining a key identifier of the node key space for the piece of data based on the identifier; and identifying a database node of the identified database cluster to which the key identifier of the node key space is assigned.

13. The system as recited in claim 12, wherein the instructions, when executed by the at least one processor, further cause the system to:

determine the key identifier of the cluster key space for the piece of data based on the identifier by performing a hash on the identifier and calculating the key identifier of the cluster key space using a first set of bits of the hash; and determine the key identifier of the node key space for the piece of data based on the identifier by calculating the key identifier of the node key space using a second set of bits of the hash.

14. A non-transitory computer readable medium storing instructions thereon that, when executed by at least one processor, cause a computer system to:
 distribute a plurality of cluster partitions among a plurality of database clusters, each database cluster including a plurality of database nodes;
 allocate a node key space among the plurality of database nodes of each database cluster of the plurality of database clusters;
 store data in the database nodes of the corresponding database clusters by identifying an assigned database cluster of the plurality of database clusters based on the plurality of cluster partitions and identifying an assigned node of the assigned database cluster based on the node key space;
 modify the plurality of database clusters by adding or removing one or more database clusters;
 re-distribute the plurality of cluster partitions among the modified plurality of database clusters while maintaining the allocation of the node key space among the plurality of database nodes of each database cluster of the plurality of database clusters; and
 move at least a portion of the data between the modified plurality of database clusters based on the re-distribution of the plurality of cluster partitions.

15. The non-transitory computer readable medium of claim 14, further comprising instructions that, when executed by the at least one processor, cause the computer system to assign key identifiers of a cluster key space to the cluster partitions of the plurality of cluster partitions.

16. The non-transitory computer readable medium of claim 15, further comprising instructions that, when executed by the at least one processor, cause the computer system to map data to cluster partitions of the plurality of cluster partitions and corresponding database clusters by performing steps comprising:
 identifying an identifier associated with a piece of data;
 determining a key identifier of the cluster key space for the piece of data based on the identifier;
 identifying a cluster partition of the plurality of cluster partitions to which the key identifier of the cluster key space is assigned; and
 identifying a database cluster of the plurality of database clusters to which the identified cluster partition is assigned.

17. The non-transitory computer readable medium of claim 16, further comprising instructions that, when executed by the at least one processor, cause the computer system to assign key identifiers of the node key space to the plurality of database nodes of each database cluster.

18. The non-transitory computer readable medium of claim 17, further comprising instructions that, when executed by the at least one processor, cause the computer system to map the piece of data to a database node of the identified database cluster, wherein mapping the piece of data to the database node of the identified database cluster comprises:
 determining a key identifier of the node key space for the piece of data based on the identifier; and
 identifying the database node of the identified database cluster to which the key identifier of the node key space is assigned.

19. The non-transitory computer readable medium of claim 18, wherein:
 determining the key identifier of the cluster key space for the piece of data based on the identifier comprises performing a hash on the identifier and calculating the key identifier of the cluster key space using a first set of bits of the hash; and
 determining the key identifier of the node key space for the piece of data based on the identifier comprises calculating the key identifier of the node key space using a second set of bits of the hash.

20. The non-transitory computer readable medium of claim 18, wherein re-distributing the plurality of cluster partitions among the modified plurality of database clusters comprises re-assigning the identified cluster partition from the identified database cluster to another database cluster of the plurality of database clusters.

* * * * *